United States Patent

Chojecki et al.

[11] Patent Number: 6,029,782
[45] Date of Patent: Feb. 29, 2000

[54] MULTIPLE ACTUATOR BRAKE

[75] Inventors: Douglas Alan Chojecki; Randy Dean Kelley, both of Wichita Falls, Tex.

[73] Assignee: Dana Corporation, Toledo, Ohio

[21] Appl. No.: 09/047,002

[22] Filed: Mar. 24, 1998

[51] Int. Cl.⁷ ............................................. F16D 65/24
[52] U.S. Cl. .................... 188/170; 188/106 F; 188/71.6
[58] Field of Search ................. 188/18 A, 71.6, 188/106 F, 170, 264 A, 264 AA

[56] References Cited

U.S. PATENT DOCUMENTS

| | | | |
|---|---|---|---|
| 2,955,678 | 10/1960 | Schjolin et al. | 188/18 |
| 3,599,760 | 8/1971 | Moss | 188/170 |
| 3,631,943 | 1/1972 | Roob et al. | 188/264 D |
| 3,830,345 | 8/1974 | Boyles | 188/71.6 |
| 3,941,219 | 3/1976 | Myers | 188/170 |
| 3,946,837 | 3/1976 | Houser | 188/170 |
| 3,999,634 | 12/1976 | Howell | 188/71.6 |
| 4,102,438 | 7/1978 | Rancourt | 188/18 A |
| 4,207,969 | 6/1980 | Howell | 188/71.6 |
| 4,261,442 | 4/1981 | Kovalenko | 188/18 A |
| 4,805,744 | 2/1989 | Pringle | 188/71.5 |
| 5,205,380 | 4/1993 | Paquet et al. | 188/18 A |
| 5,330,034 | 7/1994 | Rancourt et al. | 188/71.6 |
| 5,366,046 | 11/1994 | Klaue | 188/71.6 |
| 5,906,253 | 5/1999 | Rancourt et al. | 188/264 AA |

*Primary Examiner*—Chris Schwartz
*Attorney, Agent, or Firm*—Dykema Gossett PLLC

[57] ABSTRACT

A brake having multiple actuators is provided. In one embodiment the brake includes a torque transmission assembly centered about a longitudinal axis, a hub that is rotatable about the axis, and first and second pressure plate assemblies that are axially movable relative to the torque transmission assembly and each other. The brake also includes a drive plate assembly responsive to axial movement of the first pressure plate assembly for braking the rotation of the hub relative to the torque transmission assembly. Springs urge the second pressure plate assembly in a first axial direction towards the first pressure plate assembly and the first pressure plate assembly towards the drive plate assembly thereby setting the brake. One actuator is used to urge the second pressure plate assembly in a second axial direction, opposite the first axial direction and away from the first pressure plate assembly, to thereby release the brake. Another actuator is used to again urge the first pressure plate assembly in the first axial direction to control braking torque. In another embodiment, a brake is provided having the above-mentioned torque transmission assembly, hub, first pressure plate assembly, and drive plate assembly. Multiple, axially-spaced actuators are used to urge the pressure plate assembly towards the drive plate assembly and to provide a greater range of braking torque.

18 Claims, 4 Drawing Sheets

MULTIPLE ACTUATOR BRAKE

BACKGROUND OF THE INVENTION

1. Field of the Invention

This invention relates to brakes and, more particularly, to brakes having multiple actuators that enable either more responsive control of braking torque or an increase in braking torque.

2. Disclosure of Related Art

Conventional brakes typically employ a single actuator for setting or releasing the brake. However, the use of a single actuator to either set or release the brake has drawbacks.

In brakes that use a single actuator to release the brake, the actuator is responsible for both releasing the brake (i.e., overcoming the setting force of the springs or other means for setting the brake) and controlling braking torque. Because control of the braking torque is not independent of the brake release, however, control of the braking torque becomes a function of both the force exerted by the actuator and the force exerted by the springs or other means for setting the brake. As a result, the ability of a user to control the braking torque through use of the actuator is somewhat limited.

In brakes that use a single actuator to set the brake, the use of a single actuator limits the braking torque that can be generated. In a conventional disc brake, for example, the brake discs are aligned along an axis. The actuator exerts a force along that axis to compress the brake discs and set the brake. The axial force exerted by the actuator, however, is limited by the radial surface area on which it acts, and, therefore, by the diameter of the brake. The braking torque is proportionately limited.

There is thus a need for a brake that will minimize or eliminate one or more of the above-mentioned deficiencies.

SUMMARY OF THE INVENTION

The present invention provides a brake having multiple actuators.

An object of the present invention is to provide a brake in which the brake release and braking torque can be independently controlled.

Another object of the present invention is to provide a brake that is capable of generating a increased braking torque as compared to conventional brakes.

In one embodiment of the present invention, one actuator is used to release the brake and another actuator is used to control braking torque. The brake includes a torque transmission assembly having a first longitudinal axis, a hub rotatable about the longitudinal axis, and first and second pressure plate assemblies axially movable relative to the torque transmission assembly. The brake also includes a drive plate assembly responsive to axial movement of the first pressure plate assembly for braking rotation of the hub relative to the torque transmission assembly. The brake further includes means, such as a spring, for applying a setting force to the second pressure plate assembly to urge the second pressure plate assembly in a first axial direction towards the first pressure plate assembly. Consequently, the first pressure plate assembly is urged in the first axial direction towards the drive plate assembly. The brake also includes first actuator means for applying a first release force to the second pressure plate assembly to urge the second pressure plate assembly in a second axial direction, opposite the first axial direction. In a preferred embodiment, the brake includes means for applying a second release force to the first pressure plate assembly to urge the first pressure plate assembly in the second axial direction and away from the drive plate assembly. Finally, the brake includes second actuator means for applying a control force to the first pressure plate assembly to urge the first pressure plate assembly in the first axial direction towards the drive plate assembly. The control force is adapted to vary a braking torque. The use of first and second actuator means allows the brake release and braking torque to be independently controlled. Therefore, control of the braking torque is independent of any force exerted by the springs or other means for applying a setting force—making braking torque control more responsive to the brake operator.

In another embodiment of the present invention, multiple actuators are used to increase the braking torque that may be generated by the brake. The brake includes a torque transmission assembly having a first longitudinal axis, a hub rotatable about the longitudinal axis, and a pressure plate assembly axially movable relative to the torque transmission assembly. The pressure plate assembly includes first and second circular members that are axially spaced from one another. The brake also includes a drive plate assembly responsive to axial movement of the pressure plate assembly for braking rotation of the hub relative to the torque transmission assembly. The brake further includes a first actuator disposed between the torque transmission assembly and the first circular member of the pressure plate assembly and a second actuator disposed between the torque transmission assembly and the second circular member of the pressure plate assembly. Actuation of either, or both, of the first and second actuators urges the pressure plate assembly in a first axial direction towards the drive plate assembly and causes the drive plate assembly to apply a braking torque to the hub. The use of multiple, axially-spaced actuators increases the axial force that may be exerted on the drive plate assembly—without increasing the diameter of the brake itself. As a result, a greater braking torque range is achieved without a substantial increase in the size of the brake.

One advantage of the present invention results from the use of a completely connected pressure plate assembly. Such an assembly is unlikely to require extensive repair and/or maintenance. Also, with respect to the first embodiment described above, the use of such an assembly allows more efficient transmission of the forces associated with setting and releasing and controlling the brake.

These and other features and objects of this invention will become apparent to one skilled in the art from the following detailed description and the accompanying drawings illustrating features of this invention by way of example.

DETAILED DESCRIPTION OF THE PREFERRED EMBODIMENT

Figure 1:
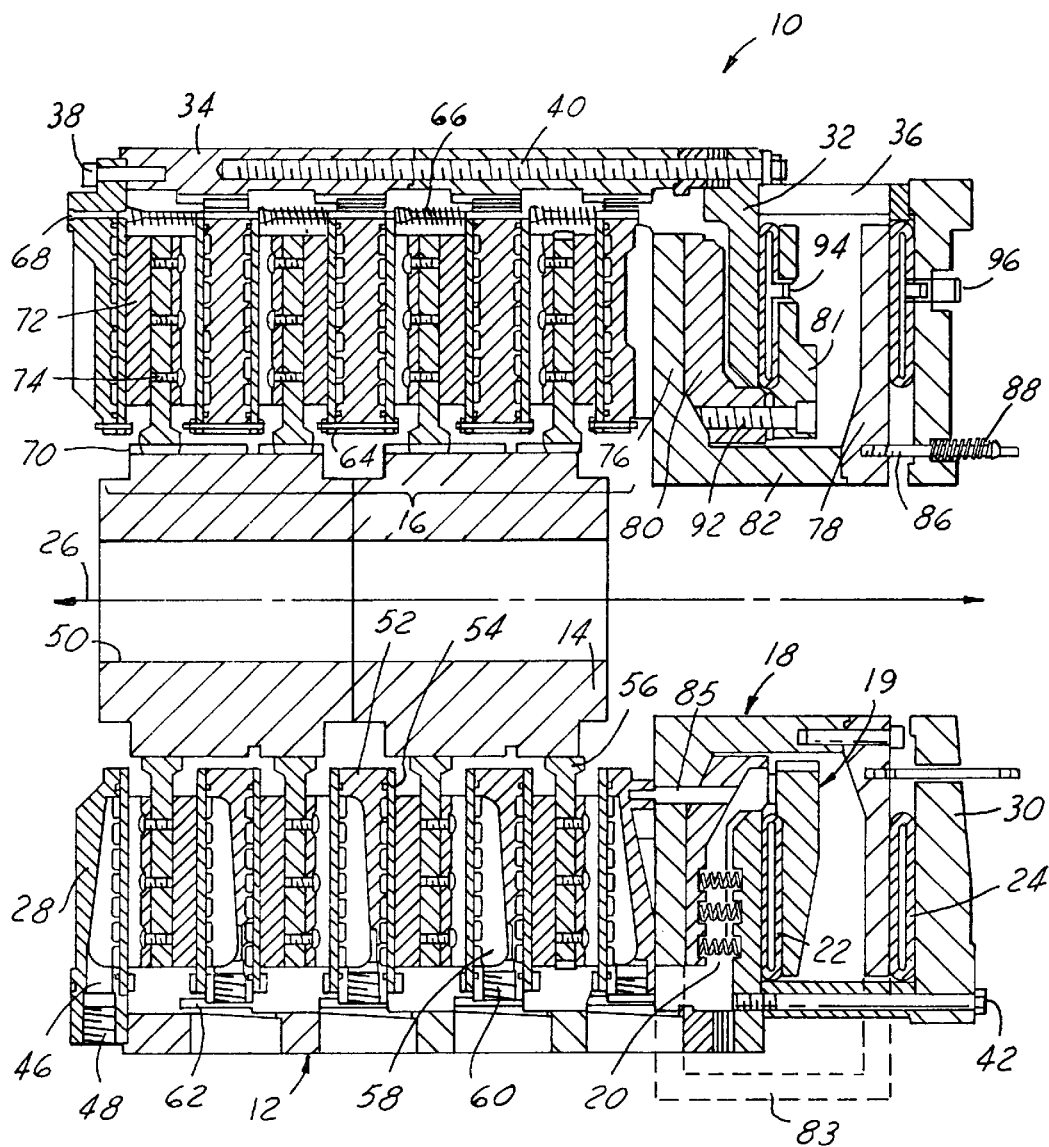
FIG. 1 is a fragmentary cross-sectional view of a first embodiment of a brake in accordance with the present invention.

Referring now to the drawings wherein like reference numerals are used to identify identical components in the various views, FIG. 1 illustrates a brake 10 in accordance with the present invention. Brake 10 includes the following elements: a torque transmission assembly 12; a shaft hub 14; a drive plate assembly 16; a first pressure plate assembly 18; a second pressure plate assembly 19; means, such as springs 20, for applying a setting force to plate assembly 19; means, such as actuator 22, for applying a release force to plate assembly 19; and means, such as actuator 24, for applying a control force to plate assembly 18.

Torque transmission assembly 12 may be made from a wide variety of conventional metals and/or plastics and may be centered about a longitudinal axis 26. Assembly 12 includes end portions 28, 28, an intermediate portion 32, and axial portions 34, 36 and is provided to transmit a torque from water jackets 52 to end portion 30 resulting from the application of a braking force by brake 10. End portion 28 is circular, extends radially inwardly, and has a central aperture extending therethrough. End portion 28 may be connected to axial portion 34 by bolts 38, screws, or other fastening means. Intermediate portion 32 is also circular, extends radially inwardly, and has a central aperture extending therethrough. Intermediate portion 32 may be connected to axial portion 34 by screws 40, bolts, or other fastening means. Intermediate portion 32 may also be connected to axial portion 36 by screws 42, bolts, or other fastening means. End portion 30 is also circular. In the embodiment illustrated in FIG. 1, end portion 30 extends radially inwardly and has a central aperture extending therethrough. In an alternative embodiment, illustrated in FIG. 2, end portion 30 may extend across axis 26. End portion 30 may be connected to axial portion 36 by screws 42. Assembly 12 may also include a passage 46 terminating in an inlet 48 for the introduction of water or another cooling medium. It should be understood that assembly 12 make take on a plurality of forms as is known in the art. For example, axial portions 34 and 36 may be substantially circular in shape and unitary in construction. Alternatively, one or both of axial portions 34 and 36 may comprise a plurality of axially extending pins.

Shaft hub 14 is provided to house a rotating shaft (not shown) and may be connected to the shaft in a conventional manner for rotation therewith about axis 26. Hub 14 may be made from conventional metal alloys. Hub 14 includes an aperture 50 that extends through hub 14 along axis 26 and that is configured to receive the rotating shaft.

Drive plate assembly 16 is provided to transmit a braking force, resulting from the axial movement of plate assembly 18, to hub 14 as described in further detail hereinbelow. Drive plate assembly 16 is disposed within torque transmission assembly 12 and is responsive to axial movement of pressure plate assembly 18 for braking the rotation of hub 14 relative to assembly 12. In the illustrated embodiment, drive plate assembly 16 includes water jackets 52, stator drive plates 54, and rotor drive plates 56. It should be understood, however, that drive plate assembly 16 may take on a plurality of forms as is known in the art. For example, water jackets 52 may be replaced by an air-cooled mechanism.

Water jackets 52 are conventional in the art and are provided to reduce the heat generated in brake 10 by the frictional engagement of stator drive plates 54 and rotor drive plates 56. Each jacket 52 includes a passage 58 terminating at an inlet 60 for the introduction of water or another cooling medium. Jackets 52 may be coupled to axial portion 34 of assembly 12 by one or more splines 62 such that jackets 52 are axially movable relative to assembly 12, but are restrained from rotation relative to assembly 12. Similarly, where assembly 12 comprises a plurality of axially extending pins, jackets 52 may be coupled directly to the pins such that jackets 52 are axially movable relative to assembly 12, but are restrained from rotation relative to assembly 12.

Both stator drive plates 54 and rotor drive plates 56 are conventional in the art and may be made from a variety of conventional metals, including iron. In a preferred embodiment, stator drive plates 54 are made from copper to enhance frictional heat transfer within brake 10. Stator drive plates 54 may be connected to water jackets 52 by bolts 64 or other fastening means. Springs 66 may be used to bias plates 54 and jackets 52 axially apart upon release of brake 10 and may be connected at each end to bolts 68 that extend axially through each jacket 52 and end portion 28 of assembly 12. Rotor drive plates 56 may be coupled to hub 14 by one or more splines 70 such that plates 56 rotate with hub 14, but are also axially movable relative to hub 14 and assembly 12. Alternatively, plates 56 may be coupled directly to a rotating shaft (not shown). Each drive plate 56 may include a conventional friction material 72 connected to each side of plate 56 by screws 74 or other fastening means.

Pressure plate assembly 18 is provided for selective engagement with drive plate assembly 16 to set, release, and vary the braking torque within brake 10. Assembly 18 may be made from a variety of materials including conventional metal alloys and is axially movable relative to assembly 12. Assembly 18 includes circular members 76, 78 and a connecting member 82 that extends axially and connects members 76 and 78. In the illustrated embodiment, connecting member 82 is integral with circular end member 76. Assembly 18 may also include another connecting member 83 (shown in broken line in FIGS. 1 and 2) that connects members 76 and 78 to provide increased strength to assembly 18. Member 83 may be disposed radially outwardly of torque transmission assembly 12.

Figure 2:
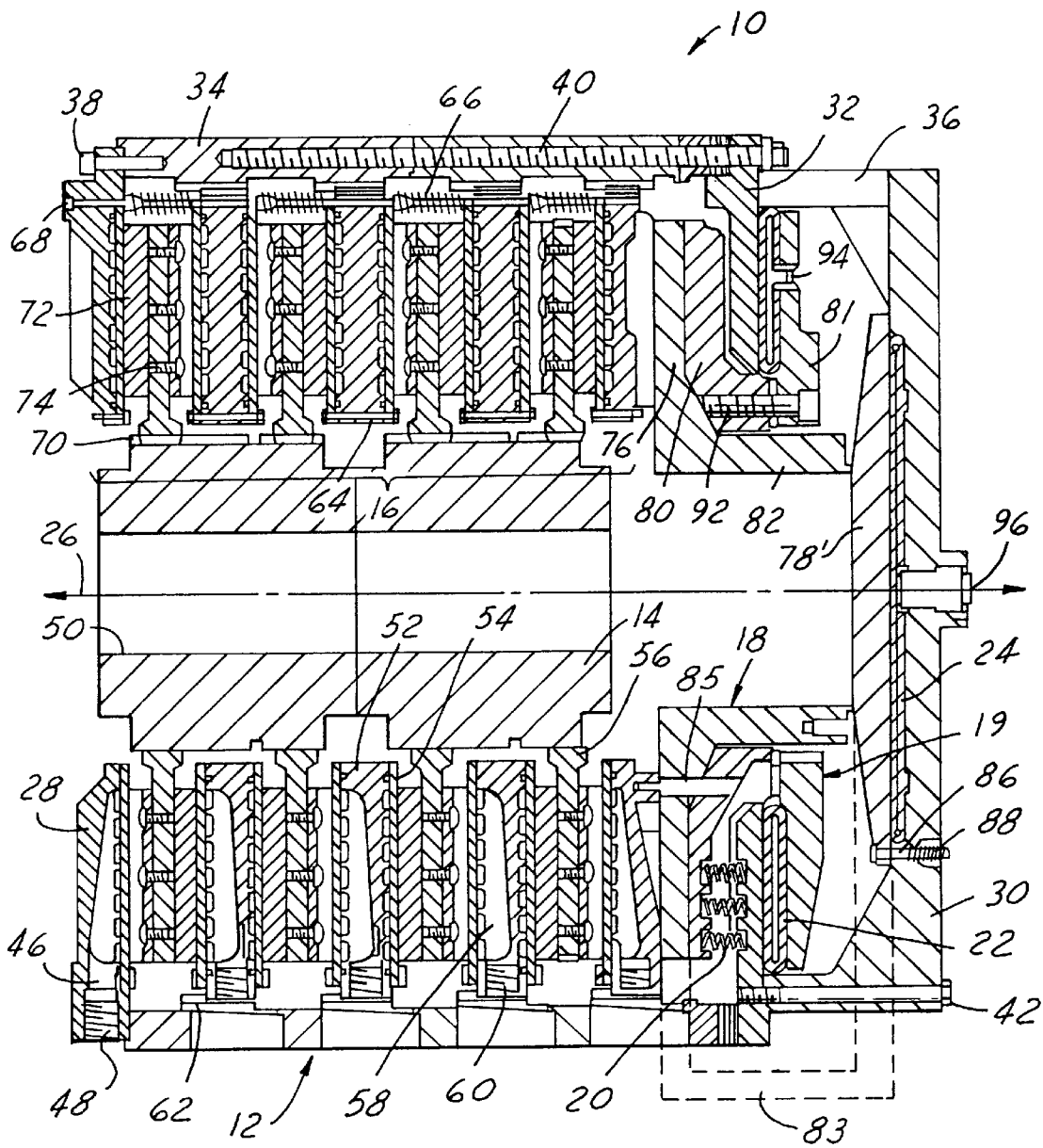
FIG. 2 is a fragmentary cross-sectional view of a alternative embodiment of the brake of FIG. 1.

Circular end member 76 is configured to engage drive plate assembly 16 and extends radially outwardly from connecting member 82. Circular end member 78 may also extend radially outwardly from member 82 as shown in the embodiment illustrated in FIG. 1. However, as shown in FIG. 2, the circular end member (numbered 78' in FIG. 2) may alternatively extend across axis 26. As shown by the broken lines in FIGS. 1 and 2, each of circular members 76 and 78 may extend through openings (not shown) in assembly 12 and be joined to connecting member 83. Referring again to FIG. 1, member 78 may be connected to connecting member 82 by bolts 84, screws or other fastening means. Alternatively, as shown in FIG. 2, member 78' may be integral with member 82.

Pressure plate assembly 19 is provided for selectively urging pressure plate assembly 18 towards drive plate assembly 16. Like assembly 18, assembly 19 may be made from a variety of materials including conventional metal alloys and is axially movable relative to assembly 12. Assembly 19 is also axially movable relative to assembly 18. Assembly 19 includes first and second circular members 80, 81. Members 80, 81 are disposed between members 76 and 78 of assembly 18 and are disposed on either side of intermediate portion 32 of torque transmission assembly 12. Members 80, 81 may be connected to one another by various fastening means including screws 92 or bolts. Assembly 19 is aligned with assembly 18 through pins 85 that extend between member 76 of assembly 18 and member 80 of assembly 19.

Springs 20 are provided to bias brake 10 into a set position and are conventional in the art. Springs 20 are disposed between intermediate portion 32 of torque transmission assembly 12 and member 80 of pressure plate assembly 19. Springs 20 apply a setting force to assembly 19 to urge assembly 19 in a first axial direction (to the left in FIGS. 1 and 2) towards member 76 of assembly 18. Consequently, assembly 18 is urged in the first axial direction towards drive plate assembly 16 to thereby set brake 10.

Actuator 22 is provided to release brake 10 and is also conventional in the art. Actuator 22 may be disposed between intermediate portion 32 of torque transmission assembly 12 and member 81 of pressure plate assembly 19. Actuator 22 may be pneumatically or hydraulically actuated through an inlet 94 via a hose (not shown) extending through assembly 12. Upon actuation, actuator 22 applies a first release force to assembly 19 to urge assembly 19 in a second axial direction (to the right in FIGS. 1 and 2), opposite the first axial direction and away from both member 76 of assembly 18 and drive plate assembly 16, to thereby release brake 10. In a preferred embodiment, brake 10 may also include means, such as pins 86 and springs 88, for applying a second release force directly to assembly 18 to urge assembly 18 in the second axial direction.

Actuator 24 is provided to control the braking torque in brake 10 and is also conventional in the art. Actuator 24 may be disposed between end portion 30 of torque transmission assembly 12 and member 78 of assembly 18. Actuator 24 may be pneumatically or hydraulically actuated through an inlet 96 extending through end portion 30 of assembly 12. Upon actuation, actuator 24 applies a control force to assembly 18 to urge assembly 18 in the first axial direction (to the left in FIGS. 1 and 2) towards drive plate assembly 16 and thereby vary the braking torque.

The use of multiple actuators for independent control of the brake release and braking torque is important. By using one actuator to release brake 10 and another actuator to vary the braking torque, control of the braking torque is made a function of the force generated by actuator 24 alone (i.e., control of the braking torque is independent of any force generated by springs 20). As a result, finer control of the braking torque is obtained.

The geometry of pressure plate assembly 18 also provides certain advantages. Assembly 18 allows the setting force of springs 20, the release force of springs 88, and the control force of actuator 24 to be applied to drive plate assembly 16 through axial movement of one complete, connected pressure plate assembly. As a result, pressure plate assembly 18 is able to efficiently transmit all of the respective forces and is less likely to require repair and/or maintenance.

Figure 3:
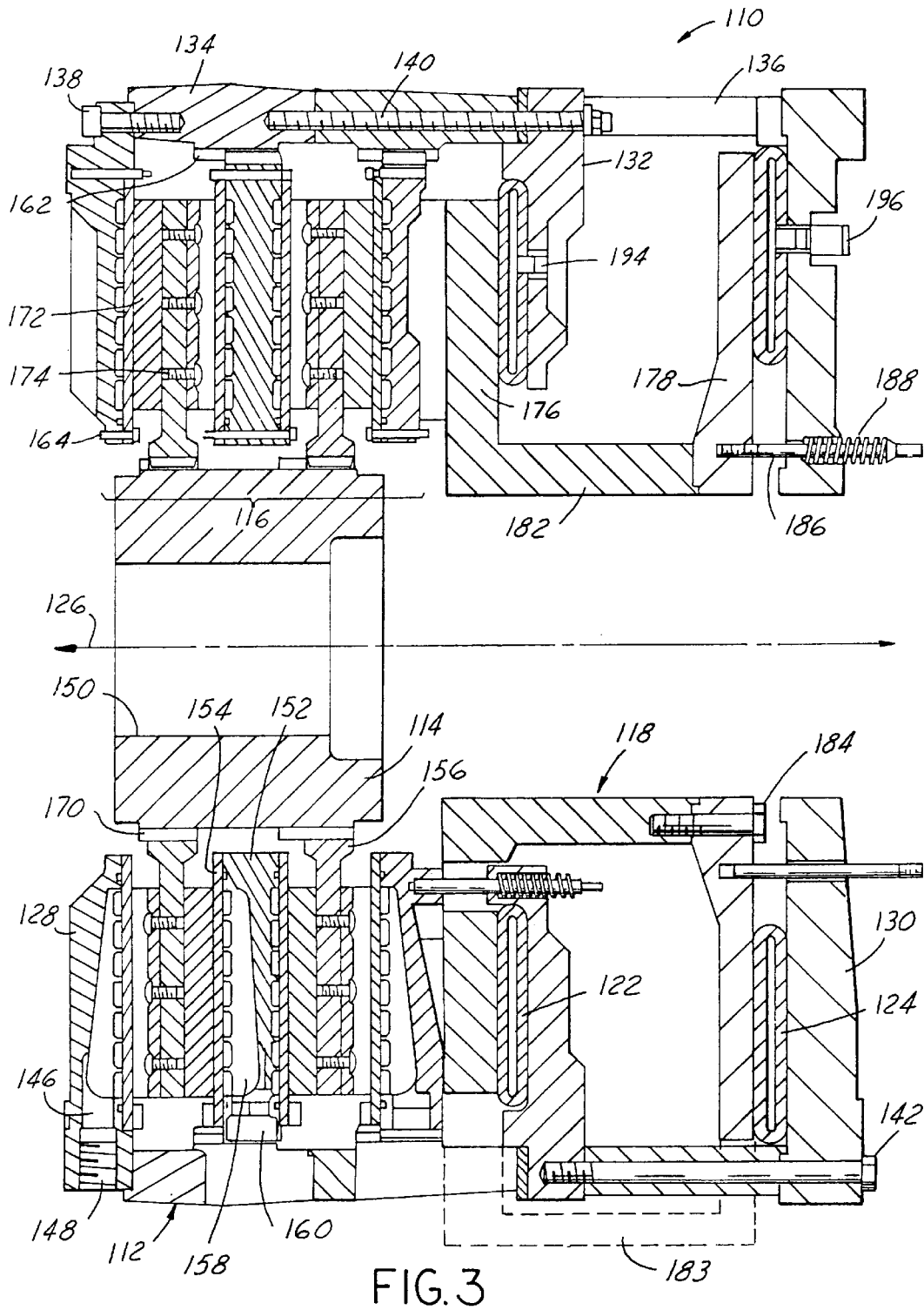
FIG. 3 is a fragmentary cross-sectional view of a second embodiment of a brake in accordance with the present invention.
Figure 4:
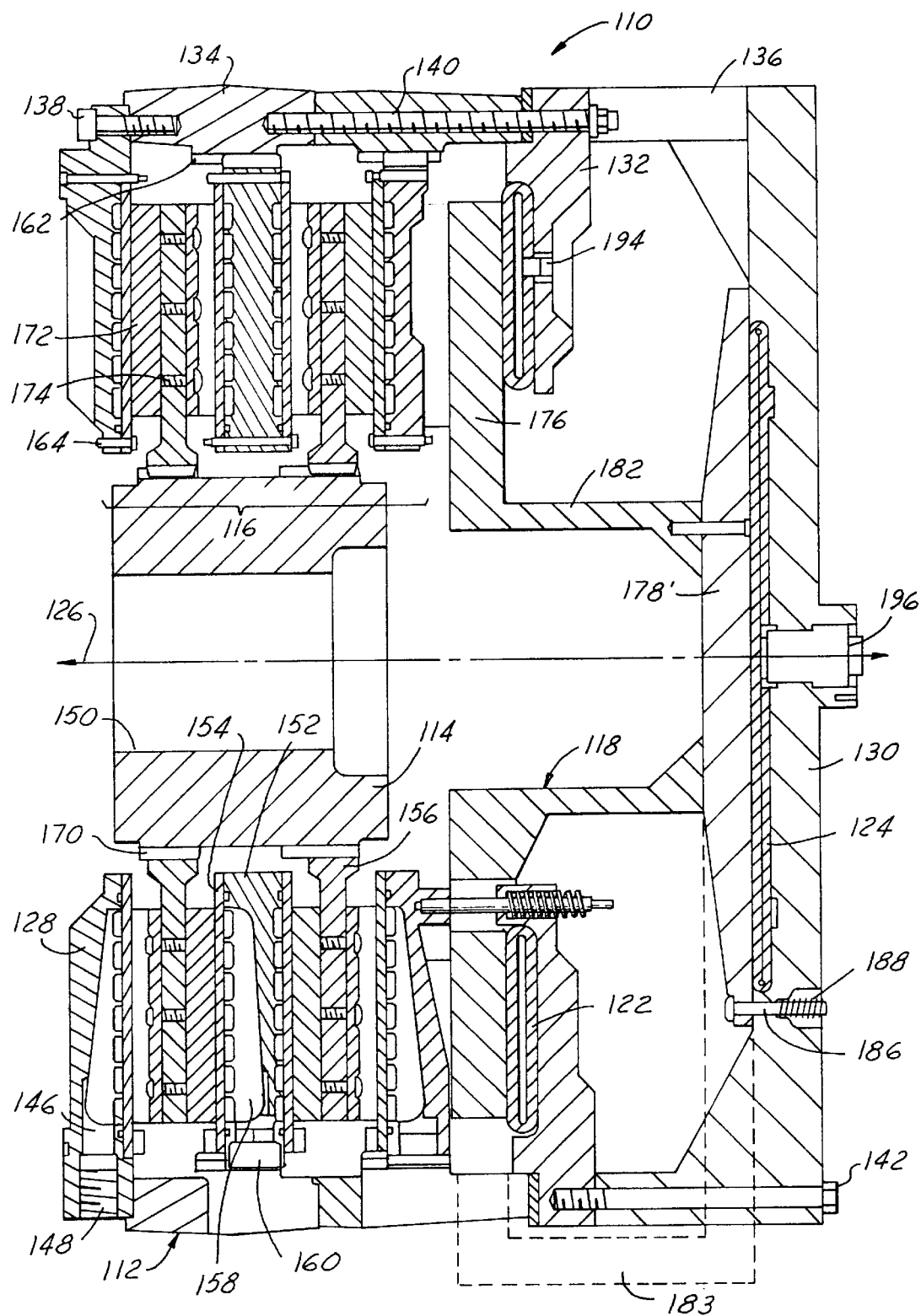
FIG. 4 is a fragmentary cross-sectional view of an alternative embodiment of the brake of FIG. 3.

Referring now to FIGS. 3 and 4, a second embodiment of a brake 110 in accordance with the present invention is shown. Brake 110 includes a torque transmission assembly 112, a shaft hub 114, a drive plate assembly 116, a pressure plate assembly 118, and a pair of actuators 122, 124.

Assembly 112 may be made from a wide variety of conventional metals and/or plastics and may be centered about a longitudinal axis 126. Assembly 112 includes end portions 128, 130, an intermediate portion 132, and axial portions 134, 136 and is provided to transmit a torque from water jackets 152 to end portion 128 resulting from the application of a braking force by brake 110. End portion 128 is circular, extends radially inwardly, and has a central aperture extending therethrough. End portion 128 may be connected to axial portion 134 by bolts 138, screws, or other fastening means. Intermediate portion 132 is also circular, extends radially inwardly, and has a central aperture extending therethrough. Intermediate portion 132 may be connected to axial portion 134 by screws 140, bolts, or other fastening means. Intermediate portion 132 may also be connected to axial portion 136 by screws 142, bolts, or other fastening means. End portion 130 is also circular. In the embodiment illustrated in FIG. 3, end portion 130 extends radially inwardly and has a central aperture extending therethrough. In an alternative embodiment, illustrated in FIG. 4, end portion 130 may extend across axis 126. End portion 130 may be connected to axial portion 136 by screws 142. Assembly 112 may also include a passage 146 terminating in an inlet 148 for the introduction of water or another cooling medium. It should be understood that assembly 112 make take on a plurality of forms as is known in the art. For example, axial portions 134 and 136 may be substantially circular in shape and unitary in construction. Alternatively, one or both of axial portions 134 and 136 may comprise a plurality of axially extending pins.

Shaft hub 114 is provided to house a rotating shaft (not shown) and may be connected to the shaft in a conventional manner for rotation therewith about axis 126. Hub 114 may be made from conventional metal alloys. Hub 114 includes an aperture 150 that extends through hub 114 along axis 126 and that is configured to receive the rotating shaft.

Drive plate assembly 116 is provided to transmit a braking force, resulting from the axial movement of plate assembly 118, to hub 114 as described in further detail hereinbelow. Drive plate assembly 116 is disposed within assembly 112 and is responsive to axial movement of pressure plate assembly 118 for braking the rotation of hub 114 relative to assembly 112. In the illustrated embodiment, plate assembly 116 includes water jackets 152, stator drive plates 154, and rotor drive plates 156. It should be understood, however, that drive plate assembly 116 may take on a plurality of forms as is known in the art. For example, water jackets 152 may be replaced by an air-cooled mechanism.

Water jackets 152 are conventional in the art and are provided to reduce the heat generated in brake 110 by the frictional engagement of stator drive plates 154 and rotor drive plates 156. Each jacket 152 includes a passage 158 terminating at an inlet 160 for the introduction of water or another cooling medium. Jackets 152 may be coupled to axial portion 134 of assembly 112 by one or more splines 162 such that jackets 152 are axially movable relative to assembly 112, but are restrained from rotation relative to assembly 112. Similarly, where assembly 112 comprises a plurality of axially extending pins, jackets 152 may be coupled directly to the pins such that jackets 152 are axially movable relative to assembly 112, but are restrained from rotation relative to assembly 112.

Both stator drive plates 154 and rotor drive plates 156 are conventional in the art and may be made from a variety of conventional metals, including iron. In a preferred embodiment, stator drive plates 154 are made from copper to enhance frictional heat transfer within brake 110. Stator drive plates 154 may be connected to water jackets 152 by bolts 164 or other fastening means. Rotor drive plates 156 may be coupled to hub 114 by one or more splines 170 such that plates 156 rotate with hub 114, but are also axially movable relative to hub 114 and assembly 112. Alternatively, plates 156 may be coupled directly to a rotating shaft (not shown). Each drive plate 156 may include a conventional friction material 172 connected to each side of plate 156 by screws 174 or other fastening means.

Pressure plate assembly 118 is provided for selective engagement with drive plate assembly 116 to apply a braking torque to hub 114. Assembly 118 may be made from a variety of materials including conventional metal alloys and is disposed within torque transmission assembly 112. Assembly 118 includes circular members 176, 178, and a connecting member 182 that extends axially and connects members 176 and 178. In the illustrated embodiment, connecting member 182 is integral with circular member 176. Assembly 118 may also include another connecting member 183 (shown in broken lines in FIGS. 1 and 2) that connects members 176 and 178 to provide increased strength to assembly 118. Member 183 may be disposed radially outwardly of torque transmission assembly 112.

Circular member 176 is configured to engage drive plate assembly 116 and extends radially outwardly from connecting member 182. Circular member 178 may also extend radially outwardly from member 182 as shown in the embodiment illustrated in FIG. 3. However, as shown in FIG. 4, the circular member (numbered 178' in FIG. 4) may alternatively extend across axis 126. As shown by the broken lines in FIGS. 3 and 4, each of circular members 176 and 178 may extend through openings (not shown) in assembly 112 and be joined to connecting member 183. Referring again to FIG. 3, member 178 may be connected to connecting member 182 by bolts 184, screws or other fastening means. Alternatively, as shown in FIG. 4, member 178' may be integral with member 182.

Actuators 122, 124 are provided to cause selective engagement of pressure plate assembly 118 with drive plate assembly 116 and are conventional in the art. Actuator 122 may be disposed between intermediate portion 132 of assembly 112 and circular member 176 of plate assembly 118. Actuator 124 is axially spaced from actuator 122 and may be disposed between end portion 130 of assembly 112 and circular member 178 of assembly 118. Actuator 122 may be pneumatically or hydraulically actuated through an inlet 194 via a hose (not shown) extending through assembly 112. Actuator 124 may also be pneumatically or hydraulically actuated through and inlet 196 that extends through end portion 130 of assembly 112. Actuation of either one of actuators 122, 124 urges pressure plate assembly 118 in a first axial direction (to the left in FIGS. 3 and 4) towards drive plate assembly 116—causing assembly 118 to engage assembly 116 and thereby apply a braking torque to hub 114. Brake 110 may also include means, such as pins 186 and springs 188 to urge plate assembly 188 in a second axial direction, opposite the first axial direction, so as to prevent unintended engagement of pressure plate assembly 118 and drive plate assembly 116.

The use of multiple, axially-spaced actuators 122, 124 in brake 110 is a significant improvement upon the prior art. In conventional brakes a single actuator provides a force along an axis to compress the axially aligned drive plates. The force is applied to a radially extending surface and the amount of force is limited by the surface area of that surface, and therefore, by the diameter of the brake. By using multiple, axially-spaced actuators operating on multiple surfaces, the amount of force that can be applied to the drive plates is increased without increasing the diameter of the brake. Increasing the amount of force that can be applied to the drive plates increases the range of the braking torque that can be applied to a rotating shaft. Simultaneously, finer tension control is provided through the use of multiple actuators.

While the invention has been particularly shown and described with reference to the preferred embodiments thereof, it is well understood by those skilled in the art that various changes and modifications can be made in the invention without departing from the spirit and scope of the invention. For example, as will be understood by those of skill in the art, both brake 10 and brake 110 may be modified to function as a clutch.

We claim:

1. A brake, comprising:

a torque transmission assembly having a longitudinal axis;

a hub rotatable about said longitudinal axis;

a first pressure plate assembly comprising a first circular member, a second circular member, and a first connecting member connecting said first and second circular members, said first circular member extending radially outwardly from said first connecting member, said first pressure plate assembly being axially movable relative to said torque transmission assembly;

a second pressure plate assembly axially movable relative to said torque transmission assembly;

a drive plate assembly responsive to axial movement of said first pressure plate assembly for braking rotation of said hub relative to said torque transmission assembly;

means for applying a setting force to said second pressure plate assembly to urge said first and second pressure plate assemblies in a first axial direction towards said drive plate assembly;

first actuator means for applying a first release force to said second pressure plate assembly to urge said second pressure plate assembly in a second axial direction, opposite said first axial direction; and, second actuator means for applying a control force to said first pressure plate assembly to urge said first pressure plate assembly in said first axial direction towards said drive plate assembly, said control force being adapted to vary a braking torque.

2. The brake of claim 1, further including means for applying a second release force to said first pressure plate assembly to urge said first pressure plate assembly in said second axial direction away from said drive plate assembly.

3. The brake of claim 1 wherein said means for applying a setting force is disposed between said torque transmission assembly and said second pressure plate assembly.

4. The brake of claim 1 wherein said first actuator means is disposed between said torque transmission assembly and said second pressure plate assembly.

5. The brake of claim 1 wherein said second actuator means is disposed between said torque transmission assembly and said first pressure plate assembly.

6. The brake of claim 1 wherein said second circular member extends radially outwardly from said first connecting member.

7. The brake of claim 1, further including a second connecting member connecting said first and second circular members.

8. A brake comprising:

a torque transmission assembly having a longitudinal axis;

a hub rotatable about said longitudinal axis;

a first pressure plate assembly axially movable relative to said torque transmission assembly;

a second pressure plate assembly axially movable relative to said torque transmission assembly and said first pressure plate assembly;

a drive plate assembly comprising a rotor drive plate and first and second stator drive plates disposed on opposite sides of said rotor drive plate, said drive plate assembly being disposed radially inwardly of said torque transmission assembly and responsive to axial movement of said first pressure plate assembly for braking rotation of said hub relative to said torque transmission assembly;

a first spring disposed between said first and second stator drive plates;

a second spring disposed between said torque transmission assembly and said second pressure plate assembly;

a first actuator disposed between said torque transmission assembly and said second pressure plate assembly; and, a second actuator disposed between said torque transmission assembly and said first pressure plate assembly.

9. The brake of claim 8 wherein said first pressure plate assembly includes:

a first circular member;

a second circular member; and, a first connecting member connecting said first and second circular members.

10. The brake of claim 9 wherein said first circular member extends radially outwardly from said first connecting member.

11. The brake of claim 10 wherein said second circular member extends radially outwardly from said first connecting member.

12. The brake of claim 9 wherein said pressure plate assembly includes a second connecting member connecting said first and second circular members.

13. The brake of claim 8, wherein said drive plate assembly further comprises a water jacket disposed proximate said first stator drive plate.

14. A brake, comprising:

a torque transmission assembly having a longitudinal axis;

a hub rotatable about said longitudinal axis;

a pressure plate assembly axially movable relative to said torque transmission assembly, said pressure plate assembly including first and second circular members, said first circular member axially spaced from said second circular member;

a drive plate assembly responsive to axial movement of said pressure plate assembly for braking rotation of said hub relative to said torque transmission assembly;

a first actuator disposed between said torque transmission assembly and said first circular member of said pressure plate assembly; and, a second actuator disposed between said torque transmission assembly and said second circular member of said pressure plate assembly wherein actuation of said first actuator urges said pressure plate assembly in a first axial direction towards said drive plate assembly and actuation of said second actuator also urges said pressure plate assembly in said first axial direction towards said drive plate assembly.

15. The brake of claim 14 wherein said pressure plate assembly includes a first connecting member connecting said first and second circular members.

16. The brake of claim 15 wherein said first circular member extends radially outwardly from said first connecting member.

17. The brake of claim 16 wherein said second circular member extends radially outwardly from said first connecting member.

18. The brake of claim 15 wherein said pressure plate assembly includes a second connecting member connecting said first and second circular members.

* * * * *